US005388037A

United States Patent [19]

Umeda et al.

[11] Patent Number: 5,388,037

[45] Date of Patent: Feb. 7, 1995

[54] LENS FOR A LIGHTING DEVICE MOUNTED ON VEHICLE

[75] Inventors: Toru Umeda, Funabashi; Takeshi Ishikawa, Setagaya; Yoshiharu Urakami, Kawasaki, all of Japan

[73] Assignee: Stanley Electric Co., Ltd., Meguro, Japan

[21] Appl. No.: 97,667

[22] Filed: Jul. 27, 1993

[30] Foreign Application Priority Data

Jul. 29, 1992 [JP] Japan .............................. 4-058417[U]

[51] Int. Cl.[6] .............................................. B60Q 1/04

[52] U.S. Cl. ...................................... 362/80; 362/294; 362/307; 362/311

[58] Field of Search .................... 362/61, 80, 294, 307, 362/310, 311

[56] References Cited

U.S. PATENT DOCUMENTS 4,931,912 6/1990 Kawakami et al. ............ 362/294 X 4,937,710 6/1990 Hurley et al. .................. 362/294 X

*Primary Examiner*—Stephen F. Husar

*Attorney, Agent, or Firm*—Weingarten, Schurgin, Gagnebin & Hayes

[57] ABSTRACT

A lens for a lighting device mounted on a vehicle, wherein said lens is composed of an aesthetic design surface portion, a foot fitting portion arranged around the periphery of said aesthetic design surface portion, and a corner portion along which said aesthetic design surface portion and said foot fitting portion are jointed to each other, characterized in that to assure that drops of dew are grown merely on the foot fitting portion of the lens regardless of the cooling action progressing outside of the aesthetic design surface portion of the lens, the aesthetic design surface portion is dimensioned to have a thickness larger than that of the foot fitting portion, and the corner portion is dimensioned to have a thickness larger than that of the aesthetic design surface portion.

4 Claims, 2 Drawing Sheets

Prior Art

LENS FOR A LIGHTING DEVICE MOUNTED ON VEHICLE

BACKGROUND OF THE INVENTION

1. Field of the Invention

The present invention relates generally to a lens for a lighting device mounted on a vehicle. More particularly, the present invention relates to improvement of a lens of the foregoing kind which assures that a phenomenon of dewing arising due to quick cooling of the inner wall surface of the lens at the time of vehicle body washing or rainfall can properly be controlled.

2. Background Art

To facilitate understanding of the present invention, a typical conventional lens of the foregoing type will be described below with reference to FIG. 3.

As shown in the drawing, a lens 92 is arranged on the front side of a lighting device 90 mounted on a vehicle, and a venting tube 91 is attached to the rear surface of the lighting device 90. To cope with a phenomenon of dewing to be visually recognized on the lighting device 90, measures have been hitherto taken such that an inner diameter of the venting tube 91 is enlarged for the purpose of improving ventilation properties of the lighting device 90, and/or a thickness of the lens 92 is increased over the whole surface of the same so as to allow the interior of the lighting device 90 to be hardly affected by the exterior cooling action presently progressing on the front surface of the lens 92.

However, these measures hitherto taken for the lighting device 90 in that way are merely intended to delay the time limit that a phenomenon of dewing arises. Thus, once the cooling action progress in excess of this limit, any other measure can not be taken for the purpose of preventing an occurrence of dewing under severe outside conditions with the result that drops of dew are grown on the surface of the lens 92 as if no measure is taken. For example, when a vehicle body is quickly cooled by spraying a large quantity of water, a phenomenon of dewing is visually recognized on the surface of the lens 92 although a certain measure is practically taken against the phenomenon of dewing by using a rust-proofing agent or the like. Consequently, each driver uselessly feels unreliability as to whether a phenomenon of dewing arises with his vehicle or not.

SUMMARY OF THE INVENTION

The present invention has been made in consideration of the aforementioned background.

An object of the present invention is to provide a lens for a lighting device mounted on a vehicle wherein drops of dew are grown merely on a foot fitting portion of the lens visually unrecognizable from the outside without any deterioration of aesthetic appearance of the lens.

Another object of the present invention is to provide a lens of the foregoing type which assures that dew drop growth is effected merely on the foot fitting portion regardless of severe cooling conditions outside of an aesthetic design surface portion of the lens.

The present invention provides a lens for a lighting device mounted on a vehicle wherein the lens is composed of an aesthetic design surface portion visually recognizable from the outside, a foot fitting portion arranged around the periphery of the aesthetic design surface portion and covered with a vehicle body in such a manner as to allow the foot fitting portion to be visually unrecognizable from the outside, and a corner portion along which the aesthetic design surface portion and the foot fitting portion are jointed to each other, wherein the aesthetic design surface is dimensioned to have a thickness larger than that of the foot fitting portion, and the corner portion is dimensioned to have a thickness to have a thickness larger than that of the aesthetic design surface portion.

For the same purpose of allowing drops of dew to be grown merely on the foot fitting portion, the thickness of the aesthetic design surface portion is gradually increased from the upper end of the aesthetic design surface portion down to the lower end of the same. Otherwise, the thickness of the aesthetic design surface portion may stepwise be increased from the upper end of the aesthetic design surface portion down to the lower end of the same every time lens cut is conducted on the whole surface of the aesthetic design surface portion.

To maximize the thickness of the corner portion, it is practically acceptable that the thickness of the cornet portion is increased by enlarging a radius of the corner portion on the interior side of the lighting device.

Other objects, features and advantages of the present invention will become apparent from reading of the following description which has been made in conjunction of the accompanying drawings.

BRIEF DESCRIPTION OF THE DRAWINGS

The present invention is illustrated in the following drawings in which.

DETAILED DESCRIPTION OF THE PREFERRED EMBODIMENTS

The present invention will now be described in detail hereinafter with reference to the accompanying drawings which illustrate preferred embodiments thereof.

First, a lens for a lighting device mounted on a vehicle according to a first embodiment of the present invention will be described below with reference to FIG. 1.

Figure 1:
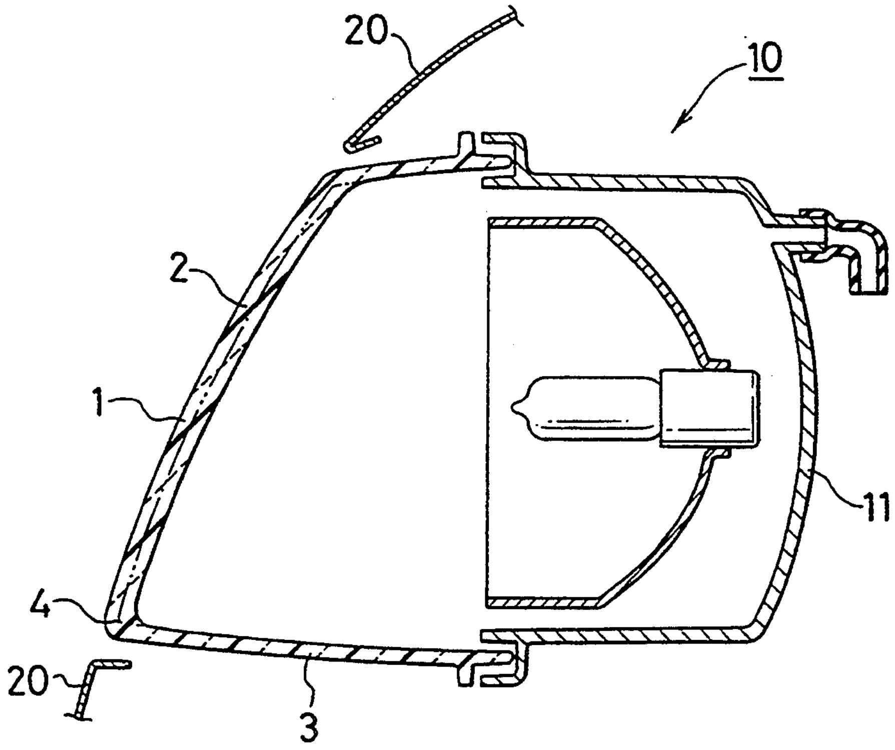
FIG. 1 is a sectional view of a lens for a lighting device mounted on a vehicle according to a first embodiment of the present invention.
Figure 3:
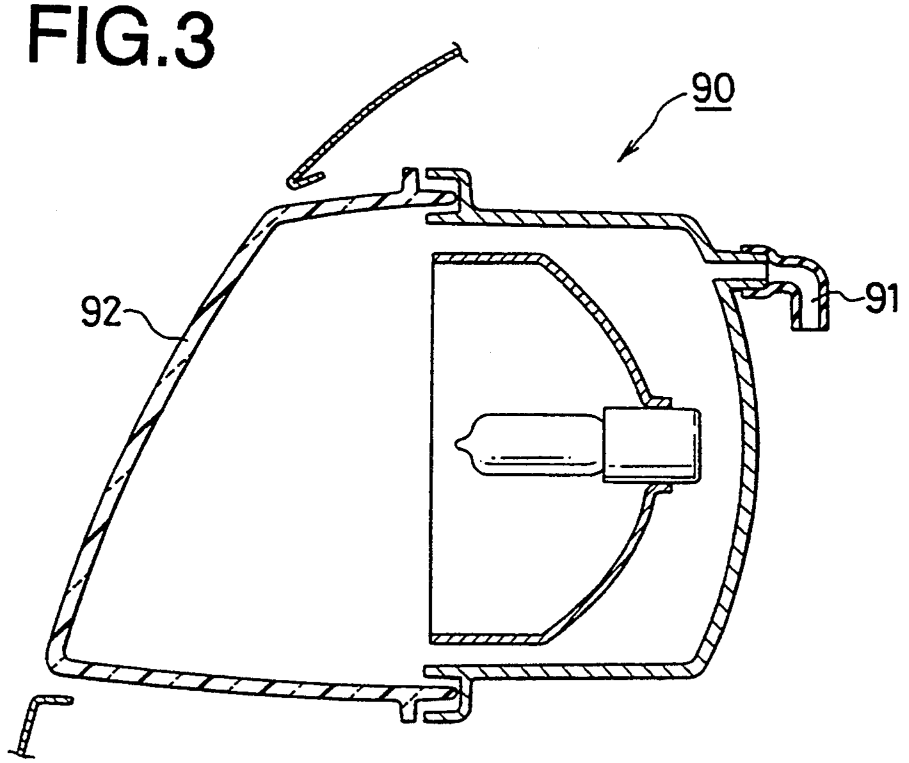
FIG. 3 is a sectional view of a conventional lens for a lighting device mounted on a vehicle.

In FIG. 1, reference numeral 1 designates a lens for a lighting device 10 mounted on a vehicle (not shown). In practice, the lens 1 is molded of a transparent synthetic resin. The lens 1 is basically constructed in the substantially same manner as the conventional lens 90 described above with reference to FIG. 3. Specifically, the lens 1 is composes of a visually recognizable aesthetic design surface portion 2 through which light generated by a light source can permeate, a visually unrecognizable foot fitting portion 3 arranged around the periphery of the aesthetic design surface portion 2 and normally covered with a vehicle body 20, and a corner portion 4 along which the aesthetic design surface portion 2 and the foot fitting portion 3 are jointed to each other.

In this embodiment, the lens 1 is constructed with a certain thickness difference among the aforementioned three surface portions. In detail, the aesthetic design surface portion 2 is dimensioned to have a thickness larger than that of the foot fitting portion 3, and the corner portion 4 is dimensioned to have a thickness larger than that of the aesthetic design surface portion 2. Thus, the respective surface portions are ranked in the order of the fitting foot portion 3, the aesthetic design surface portion 2 and the corner portion 4 as counted from the small thickness side.

In case that a part of the foot fitting portion 3 can visually be recognized from the outside of the vehicle body 20, it is recommendable that the foregoing part is not dimensioned to have a small thickness but it is dimensioned to have the same thickness as that of the aesthetic design surface portion 2. In this case, the part to be dimensioned to have a small thickness is limited only to a part of the lens 1 visually unrecognizable from the outside of the vehicle body 20. Otherwise, it is limited only to a part of the lens 1 hardly visually recognizable from the outside of the vehicle body 20. When it is required that the thickness of the corner portion 4 is increased, it is preferable that a radius of the corner portion 4 on the interior side is increased without any deterioration of the aesthetic appearance of the whole lens 1.

Next, a function and advantageous effects of the lens 1 constructed in the aforementioned manner will be described below.

When the front surface side of the lens 1 is quickly cooled at the time of, e.g., vehicle body washing, temperature reduction occurs also on the interior side of the lens 1. At this time, since the foot fitting portion 3 is dimensioned to have a smallest thickness, it is cooled to assume a lowest temperature. Thus, a phenomenon of dewing earliest arises at the foot fitting portion 3. In other words, the moisture in the lighting device 10 is condensed to grow drops of dew at the foot fitting portion 3 visually unrecognizable from the outside of the lighting device 1.

As the lens 1 is increasingly cooled, the interior side of the aesthetic design surface portion 2 assumes the initial dewing condition. At this time, however, since the humidity in the lighting device 1 is reduced due to the growth of drops of dew at the foot fitting portion 3, causing the dewing conditions to vary. As a result, any drop of dew does not grow on the inner wall surface of the aesthetic design surface portion 2. In addition, at this time, since the foot fitting portion 3 has a temperature lower than that of the aesthetic design surface portion 2, drops of dew increasingly grow still on the foot fitting portion 3.

In this embodiment, the corner portion 4 located between the aesthetic design surface portion 2 and the foot fitting portion 3 is dimensioned to have a thickness larger than that of each of the aesthetic design surface portion 2 and the foot fitting portion 3 as mentioned above. Thus, the aesthetic design surface portion 2 is hardly affected by the temperature reduction of the foot fitting portion 3, and moreover, there does not arise a malfunction that the drops of dew grown on the foot fitting portion 3 flow to the aesthetic design surface portion 2 side.

As is apparent from the above description, the lens 1 does not serve to prevent drops of dew from being grown but it controls growth of drops of dew such that they grow only at the position acceptable from the viewpoint of practical use of the lens 1. Thus, growth of drops of dew is not visually recognized within the wide range of temperature. In contrast with the conventional lens 90 described above with reference to FIG. 3, there does not arise a malfunction that a driver feels unreliability as to whether or not drops of dew are grown on the whole surface of the lens 1 once his vehicle exceeds the dewing condition at the time of vehicle body washing or the like.

Figure 2:
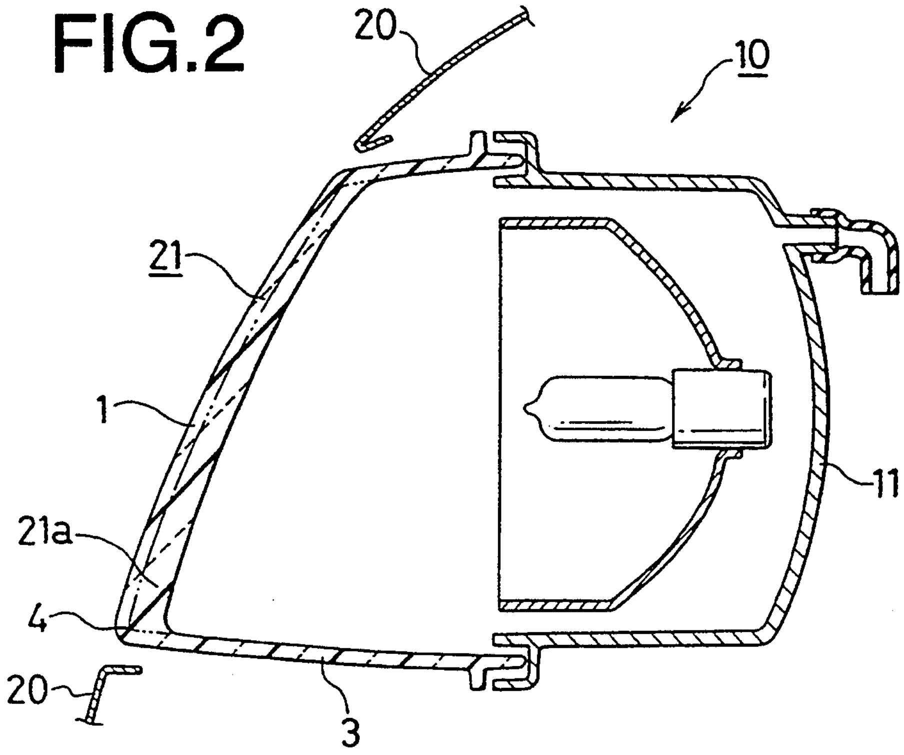
FIG. 2 is a sectional view of a lens for a lighting device mounted on a vehicle according to a second embodiment of the present invention.

Next, a lens for a lighting device mounted on a vehicle according to a second embodiment of the present invention will be described below with reference to FIG. 2. It should be noted that same components as those in FIG. 1 are designated by same reference numerals.

In the first embodiment, the aesthetic design surface portion 2 is dimensioned to have a substantially constant thickness across the whole surface thereof. In this embodiment, an aesthetic design surface portion 21 is dimensioned to have a thickness which varies across the whole surface thereof in order to enhance the aforementioned advantageous effects of the present invention. Specifically, the aesthetic design surface portion 21 is dimensioned to have a thickness which is gradually increased toward a lower end 21*a* of the design surface portion 21.

As air in the lighting device 1 convectively recirculates after the light source is turned on, a temperature difference is caused such that the upper part of the aesthetic design surface portion 21 has an elevated temperature, while the lower part of the same has a reduced temperature. Since the thickness of the aesthetic design surface portion 21 is dimensioned in the above-described manner, the elevated temperature on the inner wall surface of the lens 1 is kept constant regardless of the cooling action progressing on the exterior side, whereby it is assured that dew drop growth is limited merely to the foot fitting portion 3.

In the second embodiment, the wall thickness variation is continuously achieved from the upper end of the lens 1 to the lower end 21*a* of the same. Alternatively, it may stepwise be achieved without any particular optical malfunction every time lens cut is conducted on the front surface of the lens 1.

While the present invention has been described above with respect to two preferred embodiments thereof, it should of course be understood that the present invention should not be limited only to these embodiments but various change or modification may be made without departure from the scope of the present invention as defined by the appended claims.

What is claimed is:

1. In a lens for a lighting device mounted on a vehicle wherein said lens is composed of an aesthetic design surface portion visually recognizable from the outside, a foot fitting portion arranged around the periphery of said aesthetic design surface portion and covered with a vehicle body in such a manner as to allow said foot fitting portion to be visually unrecognizable from the outside, and a corner portion along which said aesthetic design surface portion and said foot fitting portion are jointed to each other, the improvement wherein said aesthetic design surface portion is dimensioned to have a thickness larger than that of said foot fitting portion, and said corner portion is dimensioned to have a thickness larger than that of said aesthetic design surface portion.

2. The lens according to claim 1, wherein said thickness of said aesthetic design surface portion is gradually increased from the upper end of said aesthetic design surface portion down to the lower end of the same.

3. The lens according to claim 1, wherein said thickness of said aesthetic design surface portion is stepwise increased from the upper end of said aesthetic design surface portion down to the lower end of the same every time lens cut is conducted on the whole surface of said design surface portion.

4. The lens according to claim 1, wherein said thickness of said corner portion is increased by enlarging a radius of said corner portion on the interior side of said lighting device.

* * * * *